US007569278B2

(12) United States Patent
Utesch et al.

(10) Patent No.: US 7,569,278 B2
(45) Date of Patent: Aug. 4, 2009

(54) USE OF A DOUBLE-SIDED PSA TAPE FOR BONDING IN THE PRODUCTION OF ELECTRONICS ARTICLES

(75) Inventors: Nils Utesch, Hamburg (DE); Stephan Zollner, Buchholz/Nordheide (DE); Kristin Kerber, Hamburg (DE); Alexander Herrmann, Hamburg (DE)

(73) Assignee: tesa SE, Hamburg (DE)

( * ) Notice: Subject to any disclaimer, the term of this patent is extended or adjusted under 35 U.S.C. 154(b) by 448 days.

(21) Appl. No.: 11/321,920

(22) Filed: Dec. 29, 2005

(65) Prior Publication Data

US 2007/0110941 A1    May 17, 2007

(30) Foreign Application Priority Data

Nov. 15, 2005  (DE) .................. 10 2005 054 781

(51) Int. Cl.
*B32B 25/20*   (2006.01)
(52) U.S. Cl. .................. 428/447; 428/41.4; 428/41.5
(58) Field of Classification Search ................. 428/41.4, 428/41.5, 447
See application file for complete search history.

(56) References Cited

U.S. PATENT DOCUMENTS

| 5,232,702 A | 8/1993 | Pfister et al. |
| 5,372,865 A | 12/1994 | Arakawa et al. |
| 6,521,309 B1 | 2/2003 | Chen et al. |
| 2008/0114098 A1* | 5/2008 | Griswold et al. .............. 524/55 |

FOREIGN PATENT DOCUMENTS

| DE | 692 04 236 T | 3/1996 |
| DE | 692 19 210 T | 8/1997 |
| DE | 693 24 502 T | 4/2000 |
| DE | 696 23 465 T | 8/2003 |
| DE | 10228614 | 9/2003 |
| EP | 0255226 | 2/1988 |
| EP | 0674687 | 4/1999 |
| EP | 0830428 | 9/2002 |
| JP | 2000261193 | 9/2000 |

* cited by examiner

*Primary Examiner*—Kuo-Liang Peng
(74) *Attorney, Agent, or Firm*—Norris McLaughlin & Marcus PA

(57) ABSTRACT

Use of a double-sided adhesive tape for fastening silicone rubbers, the adhesive tape having a backing and two layers of adhesive, the first layer of adhesive being composed of an acrylate-based pressure-sensitive adhesive and the second pressure-sensitive adhesive being composed of a crosslinked pressure-sensitive silicone adhesive.

10 Claims, No Drawings

USE OF A DOUBLE-SIDED PSA TAPE FOR BONDING IN THE PRODUCTION OF ELECTRONICS ARTICLES

The invention relates to the use of a double-sided adhesive tape for bonding in the production of electronics articles, in particular in connection with the production of optical data display articles (LCD products).

In the age of industrialization, pressure-sensitive adhesive (PSA) tapes are widespread processing assistants. For use in the computer industry, in particular, very exacting requirements are imposed on PSA tapes. As well as having very low outgassing, the PSA tapes ought to be useful within a wide temperature range and ought to fulfil certain optical properties.

One field of use is that of LC displays, which are required for computers, televisions, laptops, PDAs, mobile phones, digital cameras, etc.

Protection against environmental effects such as dust and moisture is provided to optical data displays (liquid-crystal displays, LCDs) in the course of their use in the electronics industry, such as in mobile phones, flatscreens, digital cameras or laptops, for example, by means of foams or elastomers, particularly those based on polyethylene (PE), polyurethane (PU) and silicone. Furthermore, on account of their shock absorber properties, the said materials preserve the LCDs from destruction by one-off or repeat collisions or impacts (providing what is known as LCD cushioning). Its viscoelastic profile qualifies silicone in particular for the vibration damper function, and additionally, in comparison to PE and PU, silicone has the widest service temperature range and the highest chemical and physical resistance.

The outstanding properties of silicone rubbers and silicone foams include not only their high UV stability and ozone stability but also, in particular, the combined functions of high temperature resistance, elasticity, and pronounced damping with respect to shocks and vibrations. Moreover, long-term temperature loads in the range from −75° C. to 260° C. have no adverse effects on the physical properties of silicone rubbers. In relation to this, silicone rubbers and silicone foams find broad application in the LCD cushioning field.

Adhesive tapes based on two different PSAs, such as polyacrylates and silicone, are known for fixing said silicone rubbers and silicone foams in electronic deivces (see, for example, U.S. Pat. No. 6,521,309). These adhesive tapes are not specified with regard to the anchoring of the silicone PSA on the backing or the resistance to plasticizers contained in the substrates. Thus in the case of the adhesive tapes, in particular, a deterioration in anchoring over time is found as a result of the inward migration of the plasticizers contained in the silicone rubbers.

It is an object of the invention, therefore, to provide adhesive tapes which largely avoid inward migration of plasticizers and yet satisfy the technical adhesive requirements for the abovementioned fields of application.

It has been possible to achieve this object through the use of specific adhesive tapes as set out in the main claim. The subclaims relate to developments of that use. The claims additionally relate to an adhesively bonded unit thus produced.

The main claim provides the use of a double-sided adhesive tape for fastening silicone rubbers, the adhesive tape having a backing and two layers of adhesive, the first layer of adhesive being composed of an acrylate-based pressure-sensitive adhesive and the second pressure-sensitive adhesive being composed of a crosslinked pressure-sensitive silicone adhesive.

With the adhesive tape used in accordance with the invention it is possible to fix silicone foams and silicone rubbers on a substrate easily, quickly, reliably, and space-savingly, while ensuring a permanent bond.

In accordance with the invention this is achieved, in the context of the inventive use, by using, alongside a crosslinked and hence temperature-stable acrylate PSA, a pressure-sensitive silicone adhesive which by virtue of chemical or physical crosslinking exhibits ageing resistance and plasticizer resistance.

Surprisingly, and unexpectedly for the skilled person, the inward migration of plasticizers into the silicone adhesive of the adhesive tapes used in accordance with the invention can be largely avoided by physically and/or chemically crosslinking the silicone compound of the adhesive tapes beforehand.

The skilled person knows of the crosslinking of PSAs for the purpose of enhancing the cohesion of these compounds and for setting particular technical adhesive properties. The skilled person could not have expected any influence on resistance to plasticizers, particularly since other known PSAs, such as acrylate PSAs, do not exhibit this effect. The skilled person therefore had no cause whatsoever to aim to achieve the above-stated object by means of crosslinking.

The double-sided adhesive tapes used in accordance with the invention consist of a backing, preferably in tape form, and layers of adhesive applied on either side of the backing.

Particular preference is given to using PSA tapes where the backing is composed of a PET sheet, particularly one having a thickness of 12 μm to 50 μm. The sheet ought preferably to be temperature-stable and dimensionally stable.

The first layer of adhesive is composed preferably of a pressure-sensitive acrylate adhesive. The use of this material ensures not only UV stability and chemical stability but also, in particular, a long-term temperature stability of 100° C. and a short-term temperature stability of 200° C. In order to ensure reliable bonding to a variety of substrates, this pressure-sensitive acrylate adhesive can be additized advantageously with resins, plasticizers and/or fillers.

Particular advantage attaches to using acrylate PSAs which by virtue of their chemical structure or physical nature exhibit a high level of adhesion to polar substrates.

Acrylate PSAs which have been found to be very suitable are those composed of solution or emulsion polymers or UV-crosslinked prepolymers.

With advantage the pressure-sensitive acrylate adhesive can be admixed with at least one tackifier resin.

The pressure-sensitive acrylate adhesive may further be admixed with crosslinking agents and/or additives, the latter preferably from the group of microspheres, nanoparticles, colorants, thermally conductive agents, electrically conductive agents, ageing inhibitors, light stabilizers, ozone protectants, fatty acids, plasticizers, nucleators, expandants, accelerants and/or fillers.

The first layer of adhesive serves preferably to bond the adhesive tape to a substrate. The substrate may, for example, comprise plastics or metal-plastic composites used in the electronics and telecommunications industries.

The coatweight of the first layer (2) of adhesive is preferably between 20 g/m² and 150 g/m², very preferably between 20 and 100 g/m².

The second pressure-sensitive adhesive layer serves preferably to attach the silicone rubbers or silicone foams to the adhesive tape. It is composed with particular preference of a pressure-sensitive silicone adhesive which is chemically or physically crosslinked. Free-radical crosslinking in particular can be used to reduce significantly the time-dependent ageing of the pressure-sensitive silicone adhesive, characterized by increasing cohesion and reduced adhesion. Free-radical crosslinking may advantageously be carried out chemically through the use of BPO (benzoyl peroxide) derivatives and/or through the use of electron beams.

With great advantage the silicone PSA possesses a high level of adhesion to non-polar substrates and silicone rubbers and/or silicone foams, and also to siliconized and/or silicone-containing substrates.

With particular preference the crosslinking of the pressure-sensitive adhesive silicone layer is brought about by means of electron beams (electron beam curing, EBC). Crosslinking by means of EBC in particular leads, unexpectedly, to two advantages, directly associated with one another. The radicals generated by EBC lead on the one hand to the crosslinking of the silicone PSA and on the other to the formation of a firm bond of the PSA with the PET film. Hence the migration of plasticizing reagents, present in the silicone foams or rubbers for the purpose of adjusting the viscoelastic profile, though possible, is made appreciably more difficult, and so the PSA retains its temperature stability. Because of the chemical bond of the silicone PSA to the PET film, plasticizer migration, which cannot be ruled out completely, does not give rise to any transfer of adhesive, and so a durable and reliable adhesive bond is ensured. The layer of silicone adhesive has a coatweight of preferably 20 to 100 $g/m^2$.

Silicone PSAs used for the second layer of adhesive may with particular advantage be not only the following condensation-crosslinking systems composed of silicate resins and polydimethyl- or polydiphenylsiloxanes DC 280, DC 282, Q2-7735, DC 7358, Q2-7406 from Dow Corning, PSA 750, PSA 518, PSA 910 from GE Bayer Silicones, KRT 001, KRT 002, KRT 003 from ShinEtsu, PSA 45559 from Wacker Silicones, and PSA 400 from Rhodia, but also, advantageously, the following addition-crosslinking systems composed of silicate resins, polydimethyl- or polydiphenylsiloxanes and crosslinkers (crosslinker substances, and especially functionalized hydrosilanes) DC 7657 and DC 2013 from Dow Corning, PSA 6574 from GE Bayer Silicones, and KR 3700 and KR 3701 from ShinEtsu.

It is advantageous if the backing is corona-treated before the layer of pressure-sensitive acrylate adhesive is applied and/or if a primer layer is provided between the backing and the layer of pressure-sensitive silicone adhesive.

In one very preferred procedure one or both of the pressure-sensitive adhesive layers is or are provided, prior to use in accordance with the invention, with liner materials, advantageously with release paper or release film. With particular preference the layer of pressure-sensitive acrylate adhesive is lined with a release paper or siliconized release film, and/or the layer of pressure-sensitive silicone adhesive is lined with a fluoro-siliconized film.

So that the layers of adhesive of the adhesive tape of the invention in the wound state do not come into contact with one another, or so that the silicone PSA does not come into contact with the enveloping material, both layers of adhesive are laminated individually. The enveloping material of the pressure-sensitive acrylate layer may be composed of single-sidedly siliconized paper, of siliconized, PE-coated paper or of a siliconized film. In the case of the silicone PSA a fluoro-siliconized film is used.

The following examples have been found to be particularly advantageous for the adhesive tape used in accordance with the invention.

EXAMPLE 1

| | |
|---|---|
| Release material for the first layer of adhesive | Single-sidedly siliconized, PE-coated paper with a thickness of 115 $g/m^2$ |
| First layer of adhesive | Crosslinked acrylate PSA with a coatweight of 20 $g/m^2$ |
| Backing material | PET film with a thickness of 12 μm |
| Second layer of adhesive | EBC-crosslinked silicone PSA with a coatweight of 20 $g/m^2$ |
| Release material for the second layer of adhesive | Single-sidedly fluorosiliconized PET film with a thickness of 75 $g/m^2$ |

EXAMPLE 2

| | |
|---|---|
| Release material for the first layer of adhesive | Single-sidedly siliconized, PE-coated paper with a thickness of 115 $g/m^2$ |
| First layer of adhesive | Crosslinked acrylate PSA with a coatweight of 36 $g/m^2$ |
| Backing material | PET film with a thickness of 12 μm |
| Second layer of adhesive | EBC-crosslinked silicone PSA with a coatweight of 36 $g/m^2$ |
| Release material for the second layer of adhesive | Single-sidedly fluorosiliconized PET film with a thickness of 75 $g/m^2$ |

EXAMPLE 3

| | |
|---|---|
| Release material for the first layer of adhesive | Single-sidedly siliconized, PE-coated paper with a thickness of 115 $g/m^2$ |
| First layer of adhesive | Crosslinked acrylate PSA with a coatweight of 50 $g/m^2$ |
| Backing material | PET film with a thickness of 12 μm |
| Second layer of adhesive | EBC-crosslinked silicone PSA with a coatweight of 38 $g/m^2$ |
| Release material for the second layer of adhesive | Single-sidedly fluorosiliconized PET film with a thickness of 75 $g/m^2$ |

All of these adhesive tapes have shown themselves to be very suitable for the adhesive bonding described in accordance with the invention. The adhesive tapes described are also outstandingly suitable for bonding foamed silicone rubbers and other silicone-based systems.

The invention therefore relates to a double-sided adhesive tape composed of a backing in tape form and of layers of pressure-sensitive adhesive disposed on either side of the backing, the first layer of adhesive being composed in particular of a pressure-sensitive acrylate adhesive, and the second layer of pressure-sensitive adhesive being composed in particular of a silicone adhesive, which is used for fastening vibration-damping silicone rubbers or silicone foams, the first adhesive layer serving in particular for fastening on a substrate, such as a mobile phone casing or screen casing consisting of plastic alone or of a metal-plastic composite material, and the second adhesive layer serving in particular to fix the silicone rubber or silicone foam to the adhesive tape, the crosslinked pressure-sensitive acrylate adhesive having in particular a short-term temperature stability for temperature loads of more than 200° C., and the silicone PSA, by virtue of chemical or physical crosslinking, exhibiting, on the one hand, ageing resistance, and, on the other hand, plasticizer resistance, resulting in durable anchoring of the silicone PSA to the tape backing.

In accordance with the invention, therefore, an adhesive tape system is created which is asymmetrical in terms of the construction of the product and which can be used to fix vibration-damping silicone rubbers or silicone foams rapidly and rationally into plastic casings of, for example, mobile telephones, laptops or flatscreens. In the context of these utilities it is possible either, following removal of the siliconized liner paper, to attach the adhesive tape to the substrate with the acrylate adhesive, before then removing the fluorosiliconized release film from the silicone adhesive, on which, finally, the silicone rubber is fixed, or else, following removal of the fluorosiliconized film from the silicone adhesive, the adhesive tape is first laminated extensively to the silicone rubber, after which the assembly is die-cut, and the die-cuts thus obtained, following removal of the remaining siliconized liner paper, are fastened to the substrate using the acrylate PSA. The enveloping materials used on either side serve to prevent the pressure-sensitive silicone adhesive sticking to the enveloping paper of the acrylate PSA in the wound state of the adhesive tape of the invention, which is stored and transported in roll form.

The invention further provides an adhesively bonded assembly comprising a polymeric substrate, in particular an electronic component, a double-sided adhesive tape having a backing and two layers of adhesive, the first layer of adhesive being composed of an acrylate-based pressure-sensitive adhesive and the second pressure-sensitive adhesive being composed of a crosslinked pressure-sensitive silicone adhesive, and a silicone foam or silicone rubber, the pressure-sensitive acrylate adhesive facing the polymeric substrate and the pressure-sensitive silicone adhesive facing the silicone rubber or foam. The adhesive tape used here is preferably one of the above-described adhesive tapes, with any of the embodiments described being able to be used with advantage.

The invention provides, lastly, a double-sided adhesive tape suitable for fastening silicone rubbers in electronic components, having a backing and two layers of adhesive, the first layer of adhesive being composed of an acrylate-based pressure-sensitive adhesive and the second pressure-sensitive adhesive being composed of a crosslinked pressure-sensitive silicone adhesive.

The invention claimed is:

1. A method for fastening silicone foam or silicone rubber to a substrate, which comprises fastening said silicone foam or rubber to said substrate with a double-sided adhesive tape comprising a backing and first and second layers of adhesive adhered thereto, the first layer of adhesive being composed of an acrylate-based pressure-sensitive adhesive and the second layer of adhesive being composed of a crosslinked pressure-sensitive silicone adhesive, said pressure-sensitive silicone adhesive being a condensation crosslinking system.

2. The method of claim 1, wherein said substrate is a component of an electronic device.

3. The method of claim 2, wherein said electronic device is a mobile telephones or liquid-crystal display (LCD).

4. The method of claim 1, wherein at least the pressure-sensitive silicone adhesive is physically and/or chemically crosslinked.

5. The method of claim 4, wherein at least the pressure-sensitive silicone adhesive is crosslinked by irradiation with electron beams.

6. The method of claim 1, wherein the pressure-sensitive acrylate adhesive side effects fastening on the substrate and the pressure-sensitive silicone adhesive side effects fastening on the silicone foam or silicone rubber.

7. The method of claim 1, wherein said condensation-crosslinking system is a system comprised of polydimethylsiloxanes and silicate resins or polydiphenylsiloxanes and silicate resins.

8. Adhesively bonded assembly comprising:
a) a polymeric substrate,
b) a double-sided adhesive tape comprising a backing and first and second layers of adhesive adhered thereto the first layer of adhesive being composed of an acrylate-based pressure-sensitive adhesive and the second layer of adhesive being composed of a condensation crosslinked pressure-adhesive silicone adhesive, and
c) a silicone foam or silicone rubber, the pressure-sensitive acrylate adhesive facing the polymeric substrate and the pressure-sensitive silicone adhesive facing the silicone foam or silicone rubber.

9. The adhesively bonded assembly of claim 8, wherein said polymeric substrate is an electronic component.

10. A double-sided adhesive tape for fastening silicone foam or silicone rubber in electronic components, comprising a backing and first and second layers of adhesive, the first layer of adhesive being composed of an acrylate-based pressure-sensitive adhesive and the second pressure-sensitive adhesive being composed of a condensation crosslinked pressure-sensitive silicone adhesive.

* * * * *